United States Patent [19]

Berrey et al.

[11] Patent Number: 4,523,867

[45] Date of Patent: Jun. 18, 1985

[54] BI-DIRECTIONAL DRIVE PRINT WIRE ACTUATOR WITH FORWARD-VELOCITY AND REVERSE-POSITION CLOSED LOOP FEEDBACK CONTROL

[75] Inventors: Harry R. Berrey, Waynesboro; Paul W. Caulier, Greenwood, both of Va.

[73] Assignee: Genicom Corporation, Waynesboro, Va.

[21] Appl. No.: 516,897

[22] Filed: Jul. 25, 1983

[51] Int. Cl.³ .............................. B41J 3/12; B41J 9/42
[52] U.S. Cl. .................... 400/124; 101/93.02; 101/93.05; 400/167
[58] Field of Search .............. 400/124, 157.2, 167, 400/144.2; 101/93.02, 93.05

[56] References Cited

U.S. PATENT DOCUMENTS

| | | | |
|---|---|---|---|
| 3,755,700 | 8/1973 | Buschmann et al. | 400/124 X |
| 3,900,094 | 8/1975 | Larsen et al. | 400/124 |
| 3,994,382 | 11/1976 | McIntosh | 400/124 |
| 4,062,285 | 12/1977 | Deetz et al. | 101/93.02 |
| 4,192,230 | 3/1980 | Blom et al. | 400/144.2 X |
| 4,200,401 | 4/1980 | Roy et al. | 400/124 |
| 4,211,496 | 7/1980 | Naylor | 400/124 |
| 4,218,148 | 8/1980 | Matschke | 400/124 |

FOREIGN PATENT DOCUMENTS 38149 3/1982 Japan .......................... 400/157.2

OTHER PUBLICATIONS

*IBM Tech. Disc. Bulletin.*, by W. T. Pimbley, vol. 21, No. 6, Nov. 1978, pp. 2283–2284.

Primary Examiner—Paul T. Sewell
Attorney, Agent, or Firm—Cushman, Darby & Cushman

[57] ABSTRACT

The present invention provides a bi-directional drive printer actuator with position feedback control and methods of operation to optimize the performance of impact type printers. By monitoring the position of the print wire, a forward input power pulse can be varied as to magnitude and duration to maintain a desired predetermined velocity of the print wire up until the time of impact. Further, by monitoring position feedback signals generated as the print wire returns to an at-rest position, a reverse input power pulse and forward input power pulse can be modulated for magnitude and duration to maintain a desired rearward velocity of the print wire, and bring the print wire to an at-rest position with a minimum of rebound off a back stop.

26 Claims, 8 Drawing Figures

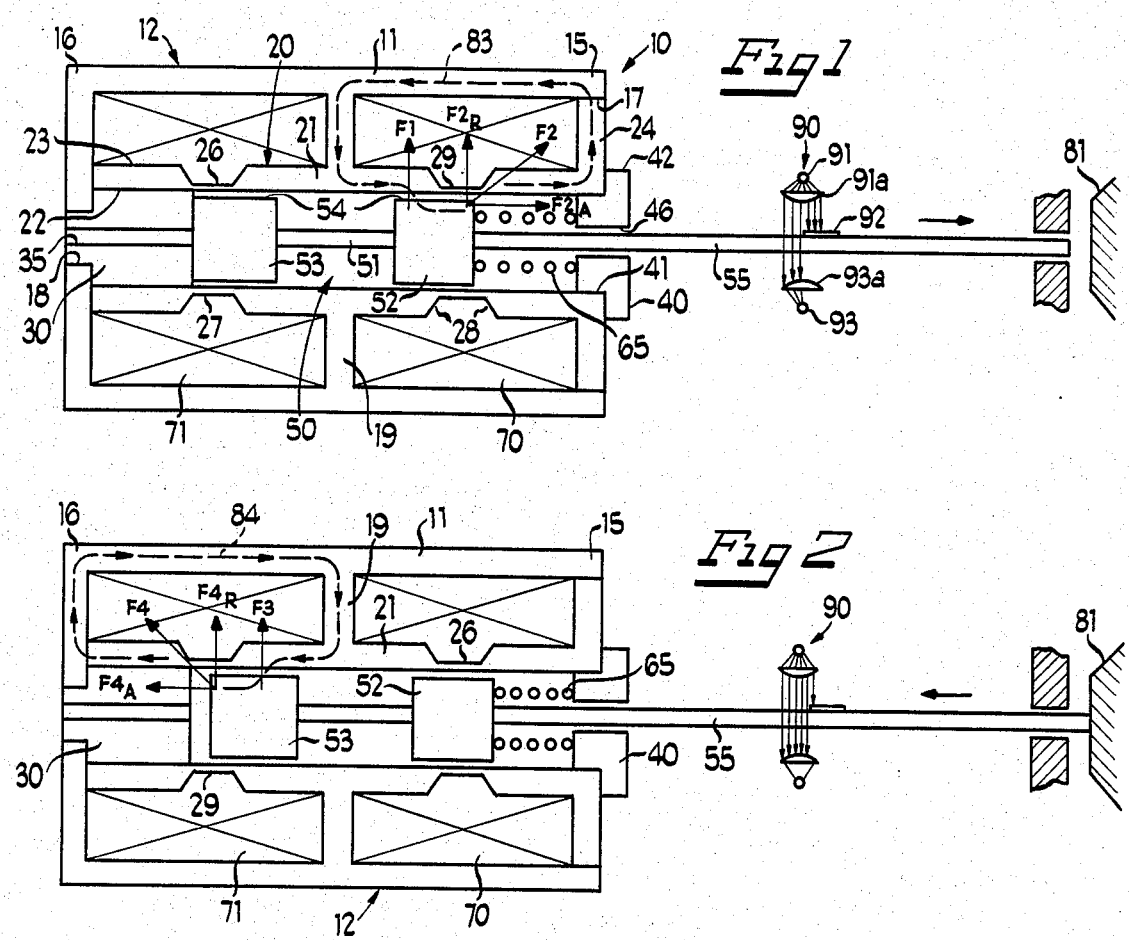
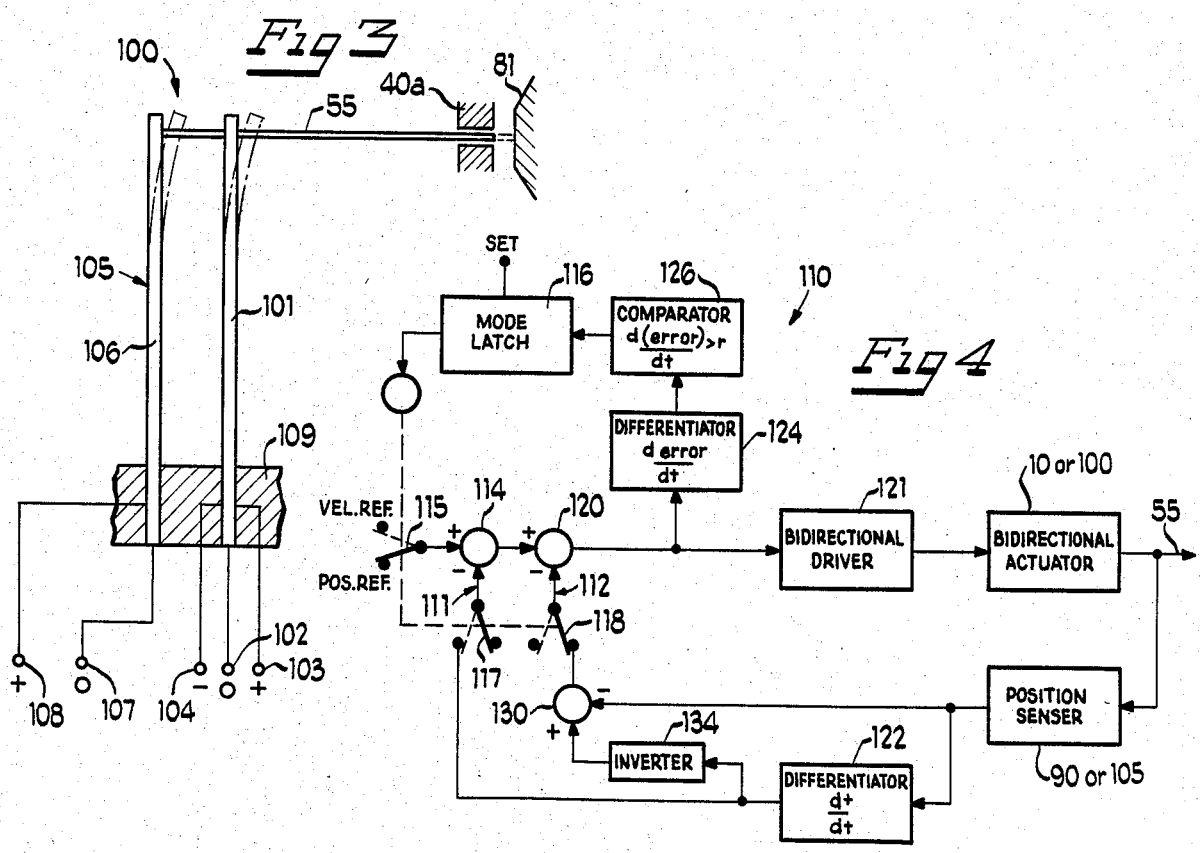

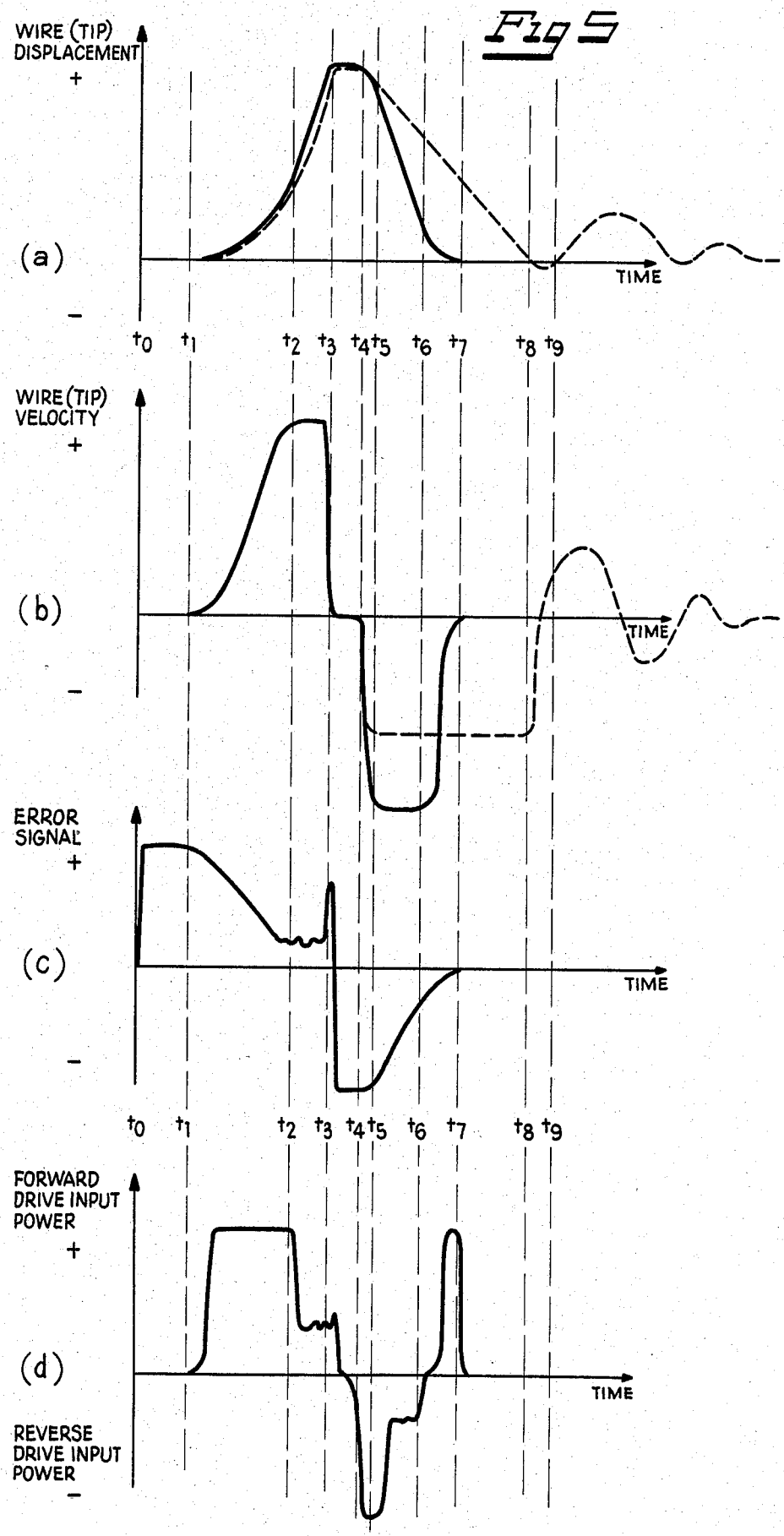

BI-DIRECTIONAL DRIVE PRINT WIRE ACTUATOR WITH FORWARD-VELOCITY AND REVERSE-POSITION CLOSED LOOP FEEDBACK CONTROL

BACKGROUND OF THE INVENTION

The present invention relates generally to impact printing devices and, more particularly, to dot matrix printers generally employing solenoid type actuators.

A typical print head for a dot matrix type printer has a plurality of print wires, each actuated by an individual print wire solenoid. This type of print wire solenoid actuator is disclosed, for example, in U.S. Pat. No. 3,775,700 issued Aug. 28, 1973. The solenoid armature, which is connected to the print wire, moves axially of the print wire between a normal rest position in which the print wire is spaced from the target surface and a printing position in which the print wire is impacted upon a target surface. When the solenoid coil is energized the armature is accelerated forwardly to drive the print wire toward its printing position.

Present impact printers are designed to quickly accelerate the print wire forward to a desired velocity and to impact the target with that velocity. Thus, the actuator applies to the coil only enough energy to accelerate the print wire to the desired impact velocity. Typically, a pulse of power is applied to the coil for a limited time sufficient to insure that the desired velocity will be reached. In this regard, velocity can be affected by a number of variables such as friction losses, primarily due to variations in the tightness of wires in the wire guides, damping losses caused by viscous damping due to ink accumulation (sometimes referred to as morning sickness), and power pulse variations in part due to circuit tolerances. Present day actuator drives must be provided with a power pulse large enough to meet minimum requirements for the worst case conditions. Since these conditions are not always present, the impact velocity of the print wire is subject to considerable variation, resulting in variable print quality.

In a dot matrix type printer, the print wire will first make contact with the ribbon, pushing the ribbon against the target surface and platen or striker bar. The print wire applies maximum impact force when the wire velocity reaches zero. All the kinetic energy of the moving printing assembly is then converted to potential energy stored in the combined spring constant of the print wire as compression and deflection forces, of the armature as bending, of the paper as compression forces, and of the spring biasing means.

The combination of spring forces causes the print wire to recoil, converting the potential energy back into kinetic energy as the print wire accelerates back to its starting position. However, the return velocity due to the recoil action in conventional print wire actuators will only be 50 to 70 percent of the forward velocity, since friction losses during impact are considerable and convert some of the energy to heat. When the print wire reaches its rest position it impacts against a back stop. Because the print wire has considerable return velocity, it tends to repeatedly bounce off the back stop. This significantly increases the time before the print wire comes completely to rest. The combination of reduced return velocity and long damping time significantly increases the minimum print cycle time of the print wire.

SUMMARY OF THE INVENTION

Embodiments of the present invention provide a bi-directional drive printer actuator with feedback control and methods of operation to optimize the performance of impact type printer actuators. By monitoring the forward velocity of the print wire, a forward input power pulse can be varied as to magnitude and duration to maintain a desired predetermined velocity of the print wire up until the time of impact with minimum energy. Further, by monitoring position feedback signals generated as the print wire returns to a rest position, a reverse input power pulse and forward input power pulse can be modulated for magnitude and duration to maintain a desired rearward velocity of the print wire, and bring the print wire to a rest position in a minimum time, yet with a minimum of rebound off the back stop.

Performance of the impact print actuator is optimized because the total time of the operation will be predictable and controlled. Further, variables such as dimensions of parts, gap settings, rebound characteristics of the target and variations in electrical input signals are readily compensated for.

Briefly, the apparatus of the present invention includes an impact print actuator for printing upon a target surface. The impact print actuator includes a frame and a drive assembly affixed thereto. A print wire is coupled to the drive assembly and movable between a first at-rest position and a second impact position against a target surface. The drive assembly is operable in a forward drive mode powering the movement of the print wire toward a target surface and a reversing drive mode powering the movement of the print wire away from the target surface. A position sensor is in communication with the print wire and provides a position signal corresponding to the displacement of the print wire as it moves between the first and second positions to allow the position of the print wire to be monitored. Other embodiments include bi-directional drive assemblies having piezoelectric bender elements or separate forward and reversing electromagnetic coils.

A further embodiment includes a control system in communication with the position sensor and the bi-directional drive assembly. The control system receives the position signal from the position sensor to modulate, activate and deactivate the bi-directional drive assembly as it operates the forward and reversing drive modes to power the print wire forward against the target surface and subsequently back to the at-rest position.

The control system includes a differentiator which receives the position signal from the position sensor and produces a velocity signal. A summer receives the velocity signal and a velocity reference signal having a predetermined value in order to generate a velocity error signal. The control system monitors the velocity error signal to modulate the forward drive mode to maintain the velocity of the print wire and the velocity signal at the preset value. The velocity error signal is further received by a second differentiator which generates a signal reflecting the rate of change of the velocity error signal which is received by a comparator. The comparator, compares the rate of change in the velocity error signal to a preset value. Upon impact the rapid deceleration of the print wire triggers the control system to deactivate the forward drive mode and activate the reversing drive mode which powers the return of the impact print wire to the rest position.

The summer of the control system also receives a velocity signal from the differentiator as the impact print wire travels in a reverse mode towards the at-rest position. The summer combines the velocity signal from the differentiator with the position signal from the position sensor to generate a corrected position signal. The corrected position signal is received by another summer which combines the corrected position signal with a position reference signal to generate a position error signal. The position error signal is monitored by the control means to modulate, activate and deactivate the drive assembly selectively in differing drive modes to accelerate the print wire back to a rest position and bring the print wire to a zero velocity as it reaches the rest position.

By generating and processing a position signal to control the movement of the print wire, as opposed to applying a power pulse of a given duration, the present invention compensates for friction losses, damping losses, power pulse variations, parts dimensions, gap settings and rebound characteristics of the target surface.

The position sensor of the present invention may take many forms, one form including a light emitting diode, flag and photo transistor. The flag is coupled to the print wire for movement therewith, with the light emitting diode positioned to emit light upon the flag and the photo transistor. Movement of the flag as the print wire moves allows different intensities of light from the light emitting diode to fall upon the photo transistor for varying displacements of the print wire.

The position sensor may also take the form of a piezoelectric bender sensing element coupled to the print wire for movement therewith. The piezoelectric sensing element produces a signal corresponding to the displacement of the print wire.

From the foregoing, it will be seen that the present invention provides features and advantages in a method and apparatus for reducing the print operation times for impact printers as well as compensating for a number of variables affecting printer operation.

Other features and advantages of the present invention will be apparent from the following description and claims and are illustrated in the accompanying drawings which, by way of illustration, show preferred embodiments of the present invention and the principles thereof and what are now considered to be the best mode to apply these principles. Other embodiments of the invention employing the same or equivalent principles may be used and structural changes may be made as desired by those skilled in the art without departing from the present invention and the purview of the appended claims.

BRIEF DESCRIPTION OF THE DRAWINGS

For the purpose of facilitating and understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view in partial section of a print wire actuator of the solenoid type generally embodying principles of the present invention in which the print wire is in a rest position;

FIG. 2 is a view similar to FIG. 1 where the print wire is in an impact position upon a target surface;

FIG. 3 is a side view in partial section of a print wire actuator having a piezoelectric drive unit and a piezoelectric position sensor construction in accordance with and embodying the features of the present invention;

FIG. 4 is a block diagram of a feedback controlled print actuator system embodying features of the present invention; and FIGS. 5(a) through 5(d) are graphs, respectively, of print wire displacement, print wire velocity, error signal and drive input power, plotted against time in a feedback controlled print wire actuator of the present invention.

DETAILED DESCRIPTION OF THE PREFERRED EMBODIMENTS

The present invention will be described in detail, and has been illustrated, as a print wire actuator, with the understanding that the present disclosure is to be considered as an exemplification of the principles of the invention and is not intended to limit the embodiment illustrated or described. Features and embodiments of the present invention have application for all impact type printers.

Referring now to FIGS. 1 and 2, there is illustrated in the drawings a print wire actuator of the solenoid type, generally designated by the numeral 10, including a bi-directional drive assembly 12 for actuating a print wire 55 of a dot matrix impact printer. The bi-directional drive assembly 12 includes a frame 11 of magnetically permeable material. The frame 11 has a proximal portion 15 toward a target surface 81 and a distal portion 16 away from the target surface 81. The proximal portion 15 has a relatively large diameter opening 17 and the distal portion 16 has a relatively small diameter opening 18, the openings 17 and 18 being coaxial. The frame 11 has a radially inwardly extending annular wall 19 intermediate the proximal and distal portions 15 and 16.

The bi-directional drive assembly 12 also includes a cylinder 20, formed of a single piece of magnetically permeable material. The cylinder 20 includes an elongated cylindrical body 21, having a cylindrical inner surface 22, a cylindrical outer surface 23, and a rim 24 extending radially outwardly toward the proximal portion 15 of frame 11. Formed in the outer surface 23 of the cylindrical body 21, intermediate the ends thereof, are two annular control grooves 26, axially spaced apart a predetermined distance. Each of the control grooves 26 is generally channel-shaped in transverse cross section, having a cylindrical bottom wall 27 and two frustoconical end walls 28, respectively connecting the edges of the inner wall 27 with the outer surface 23. The bottom wall 27 in cooperation with the inner surface 22 defines therebetween a thin control annulus 29 acting as a magnetic flux control portion.

The bi-directional drive assembly 12 also includes a cylindrical back stop 30 of non-magnetic material at the distal portion 16 of the frame 11. A bore 35 extends axially entirely through the back stop 30 to allow air to freely enter and exit the interior space of the cylinder body 21. Disposed toward the proximal end 15 of the actuator frame 11, about rim 24 of cylinder 20, is a cylindrical nozzle 40 of non-magnetic material, having a cylindrical outer surface 41 dimensioned to be received snugly against the interior surface 22 of the cylinder body 21. The nozzle 40 has a stepped cylindrical surface 42 at the forward end thereof to define a retaining lip which rests upon the rim 24 of the cylindrical body 21.

A small diameter bore 46 extends axially through the nozzle 40 to allow the print wire 55 to extend and move therethrough.

The bi-directional drive assembly 12 also includes a cylindrical armature, generally designated by the numeral 50, which includes a cylindrical neck 51 having a diameter substantially less than that of the inner surface 22 of cylinder 20. At each end of the cylindrical neck 51 are two enlarged diameter cylindrical piston portions 52 and 53. Each of the piston portions 52 and 53 is provided with an outer cylindrical surface 54 which is dimensioned to fit slidably within the inside surface 22 of the cylindrical body 21. The armature 50 is formed of a magnetically permeable material and can be of integral one-piece construction or more of component parts. The elongated print wire 55 has one end thereof snugly received in a complementary axial bore (not shown) in the piston portion 52 of the armature 50, secured in place by suitable means such as brazing. A helical compression spring 65 is disposed in surrounding relationship with the print wire 55 interposed between the nozzle 40 and the piston portion 52 to bias the armature 50 toward the back stop 30.

A coil 70 of electrical wire is wound on the cylinder 20 adjacent the rim 24 to form a forward electromagnetic coil. A second coil 71 of electrical wire is wound on the cylinder 20 adjacent to the distal end of the frame 11 to form a reversing electromagnetic coil in a similar fashion. The forward and reversing coils 70 and 71 are separated by the annular wall 19.

Referring to FIG. 1, the flux path 83 of the forward electromagnetic coil 70 when it is energized includes serially the proximal portion 15 of the frame 11, the annular wall 19 between the forward and reversing coils 70 and 71, a portion of cylinder 20, the air gap between the cylinder 20 and the piston portion 52, the piston portion 52, the air gap again, the saturated portion of the annulus 29, another portion of the cylinder 20, and the rim 24. A force F1 produced by the magnetic flux is radial around the circumference of the left-hand end of the piston portion 52, as represented by the vector F1. These radial forces cancel out. A force F2 produced by the magnetic flux at the right-hand leading edge of the piston portion 52 has the direction shown by the vector F2. This vector F2 has a radial component $F2_R$ similar to F1 and an axial component $F2_A$ which operates to drive the piston portion 52 to the right toward the desired target. While the flux path and force vectors have been illustrated only at the upper portion of the coil 70 for simplicity, it will be understood that they operate around the entire circumference of the coil 70.

After the print wire 55 has impacted against the target surface 81, the piston portion 53 is in position to be acted upon by the reversing coil 71. Referring now to FIG. 2, in which the print wire is shown impacted against the target surface 81, the magnetic flux path 84 for the reversing electromagnetic coil 71 when it is energized comprises serially the distal portion 16 of the frame 11, the annular wall 19 between the forward and reversing electromagnetic coils 70 and 71, a portion of the cylinder 20, the air gap between the cylinder 20 and the piston portion 53, the piston portion 53, the air gap again, the saturated portion of the annulus 29, another portion of the cylinder 20, and back to the distal portion 16 of the frame 11. A force F3 produced by the magnetic flux is radial around the circumference of the right-hand end of the piston portion 53, as represented by the vector F3. These radial forces cancel out. A force F4 produced by the magnetic flux at the left-hand leading edge of the piston portion 53 has the direction shown by the vector F4. This vector F4 has a radial component $F4_R$ similar to F3 and an axial component $F4_A$ which operates to drive the piston portion 53 to the left toward the back stop 30.

As shown in FIGS. 1 and 2, a position sensor 90 is provided which includes a light emitting diode (LED) 91, a flag 92 and a phototransistor 93. The flag 92 is affixed to the print wire 55. The light emitting diode 91 has a lens 91a positioned to focus emitted light from LED 91 upon the flag 92. A lens 93a is positioned to focus light from LED 91 on the phototransistor 93. Movement of the print wire 55 causes the flag 92 to be displaced, allowing varying intensities of light from the LED 91 to fall on the phototransistor 93 in relation to the movement.

Turning now to FIG. 3, an alternative embodiment of a print wire actuator is depicted, generally designated by the numeral 100. The actuator 100 includes a piezoelectric bender bi-directional drive element 101 coupled to the print wire 55 and having associated energizing terminals 102, 103 and 104. A voltage between the terminals 102 and 103 causes the piezoelectric drive element 101 to assume the position shown in phantom, bending toward the target surface 81. By placing a voltage across the terminals 102 and 104, the piezoelectric drive element 101 is bent in the opposite direction, away from the target surface 81.

A position sensor 105 is defined by a second piezoelectric bender element 106 having terminals 107 and 108. A feedback signal appears across the terminals 107 and 108 corresponding in magnitude to the displacement of print wire 55. Both piezoelectric bender elements 101 and 106 are secured within a frame or housing 109. A print wire support 40a maintains the print wire 55 in alignment with the target surface 81.

A control system, generally designated by the numeral 110, is depicted in FIG. 4. The control system 110 includes a forward velocity feedback loop 111 and a reversing position feedback loop 112. The forward velocity feedback loop 111 includes a summer 114, having one input thereof connected to the movable contact of a single-pole, double-throw switch 115, which has one fixed contact thereof connected to a velocity reference and the other fixed contact thereof connected to a position reference. The switch 115 is controlled by a mode latch 116 and is ganged with switches 117 and 118. The output of the summer 114 is connected to one input of a summer 120, the output of which is connected to the input of a bi-directional driver 121. The output of the bi-directional driver 121 is connected to the input of a bi-directional actuator, which may be either the solenoid print wire actuator 10 or the piezoelectric actuator 100. The bi-directional actuator 10 or 100 is connected to the print wire 55 and effects displacement thereof, which displacement is optically coupled to and detected by the position sensor 90 or piezoelectrically coupled to and detected by the position sensor 105. The position sensor 90 or 105 produces an output signal which is applied to a differentiator 122, the output of which is connected through the single-pole, single-throw switch 117 to the other input of the summer 114.

The output of the summer 120 is also connected to the input of a differentiator 124, the output of which is connected to a comparator 126 which has its output connected to the input of the mode latch 116. The output of the position sensor 90 or 105 is also connected to one input of a summer 130, the other input of which is connected to the output of an inverter 134 which has its input connected to the output of the differentiator 122. The output of the summer 130 is connected through the single-pole, single-throw switch 118 to the other input of the summer 120. It can be seen that the forward velocity feedback loop 111 is through the switch 117 and the reversing position feedback loop 112 is through the switch 118.

Referring now also to FIGS. 5(a) through 5(d) of the drawings, the operation of the control system 110 will now be described. At time $t_0$ a pulse is applied to mode latch 116 for switching it to a set condition in which the switches 115, 117 and 118 are moved to the dashed-line positions in FIG. 4. Thus, the reversing position feedback loop 112 is opened and the forward velocity feedback loop 111 is closed through the switch 117 and a velocity reference signal is applied through the switch 115 to one input of the summer 114. The other input of the summer 114 from differentiator 122, which is the differential of the print wire position, is substantially zero because the print wire 55 is at rest. The output of the summer 114 is an error signal which is applied substantially unaltered through the summer 120 to the bi-directional driver 121, because the other input to the summer 120 is open-circuited. This velocity error signal, which is initially of positive polarity, causes the bi-directional driver 121 to produce a forward output signal which, in the case of the solenoid actuator 10 energizes the forward electromagnetic coil 70 or, in the case of the piezoelectric actuator 100 is applied across the terminals 102 and 103.

This initial large-magnitude error signal, illustrated in FIG. 5(c), operates to drive the print wire 55 forward at full power. But because of delay caused by the magnetic and electrical circuits, this drive signal does not become effective until time $t_1$, at which time the print wire 55 begins to move forward. As indicated in FIG. 5(d), the power delivered to the print wire 55 rises rapidly to a maximum level. Most of this power is needed to accelerate the mass of the print wire 55 and the armature 50 (or piezoelectric bender 101) to the desired impact velocity, which is reached at time $t_2$. The print wire 55 continues forward at this velocity until $t_3$ when it impacts the paper or other target. The actual constant-velocity flight time from $t_2$ to $t_3$ will vary depending upon machine tolerances and variations in wire-to-paper gap settings.

During this constant velocity time interval only a reduced input power is needed to maintain the desired velocity, since only friction and damping losses have to be overcome. Thus, the system operates to reduce the drive input power at time $t_2$ (see FIG. 5(d)). This reduction is effected by the operation of the forward velocity feedback loop 111. Thus, as the print wire 55 is accelerated forwardly from $t_1$ to $t_2$, the velocity signal at the output of the differentiator 122 increases. This increasing velocity signal is subtracted from the velocity reference signal in the summer 114, the output of which decreases, as indicated in FIG. 5(c), until at $t_2$, it reaches a point at which the system shifts from a saturated mode of operation to a linear mode, causing the input power to drop to a lower level (see FIG. 5(d)). Thus, the velocity feedback loop 111 modulates the input power in the forward drive mode to maintain the desired velocity. Should the velocity of the print wire 55 begin to decrease, the resulting increase in the error signal (FIG. 5(c)) would cause a resulting increase in the power delivered to the print wire 55 to maintain it at the desired impact velocity.

As can be seen in FIG. 5(c), the velocity error signal spikes at $t_3$ upon impact of the print wire 55 with the target due to the rapid deceleration of the print wire 55 and the corresponding rapid change in the velocity signal value from the differentiator 122. The velocity error signal from the summer 114 is differentiated by differentiator 124 to produce an output signal which is compared by the comparator 126 with a set value Y. When the velocity error signal rapidly changes upon impact of the wire 55, the change in the velocity error over time exceeds the preset value Y and triggers the comparator 126 to send a triggering signal to the mode latch 116 which, through a suitable interface, switches to a reversing mode for resetting switches 115, 117 and 118 to the positions shown in solid line in FIG. 4. Thus, switch 115 is switched from receiving a velocity reference input signal to receiving a position reference signal corresponding to the at-rest position, and switch 117 is opened to open the velocity feedback loop 111. Simultaneously, switch 118 is switched to close the position feedback loop 112. At the instant of switching all input power is turned off.

In the reversing mode the actuator 10 operates to power the wire 55 to the at-rest position. In a conventional print wire actuator the wire 55 is powered in a reversing mode in the sense that it is under the influence of a biasing spring which releases its stored potential energy. The return velocity due to recoil action in a conventional print wire actuator will only be 50 to 70 percent of the forward velocity, as is illustrated in dashed line in FIG. 5(b). Thus, as shown in dashed line in FIG. 5(a), the return of a conventional print wire actuator to the at-rest position is greatly delayed compared to the forward motion. Further, the print wire arrives at the back stop with a significant velocity, the remaining energy left in the moving mass being dissipated by the repeated striking of the print wire upon the back stop material, as shown in dashed lines in FIGS. 5(a) and 5(b) after $t_8$. Thus, in conventional print wire actuators, the frequency response of a given print wire goes through resonance peaks and valleys as its period time (the time between successive actuations), approaches the minimum cycle time $t_0$–$t_8$.

Referring again to FIG. 4, the position feedback loop 112 is actuated upon the impact of the print wire 55 upon the target surface 81. The position sensor 90 or 105 again monitors the displacement of the print wire 55 producing a position signal. The position signal is applied to the summer 130. The position signal is also applied, as before in the velocity feedback loop 111, to the differentiator 122. The differentiator 122 produces a velocity feedback signal which is inverted by the inverter 134 to a positive value, which is applied to the other input of the summer 130. The summer 130 subtracts the inverted velocity feedback signal from the position signal to create a corrected or velocity stabilized position signal. The corrected position signal is applied to the summer 120 which combines the corrected position feedback signal with the position reference signal from switch 115 to produce a position error signal as seen in FIG. 5(c) at $t_3$–$t_7$.

Immediately after switching of the mode latch 116, there is a large position signal from the position sensor 90 and essentially zero velocity, so a large feedback error signal is applied to the summer 120 and subtracted from the position reference to produce a large negative position error signal. The position error signal is applied to the bi-directional driver 121 for producing a signal which energizes the reversing coil 71 (in the actuator 10) or is applied across the terminals 102 and 104 (in the actuator 100) for driving the print wire 55 in a reversing direction toward the at-rest position.

Since, initially, the rearward velocity is less than the desired velocity, the corrected position signal will have a high negative value and will predominate over the velocity reference signal to direct the bi-directional drive assembly 12 or 100 to further accelerate the print wire 55 to the at-rest position as best seen in FIG. 5(c) at $T_3$ to $t_5$. As indicated in FIG. 5(b), the print wire 55 is rapidly accelerated from $t_3$ to $t_5$ to the desired velocity. At about $t_5$, when the print wire 55 has reached its desired velocity, it begins to move rapidly away from the target surface 81 toward the at-rest position, and the position signal from the position sensor 90 begins to decrease accordingly (see FIG. 5(c)). This decrease causes the system 12 to shift from a saturated mode to a linear mode of operation, causing the rearward drive input power to drop off to a reduced level (see FIG. 5(d)) sufficient to just overcome the friction and damping losses and maintain the desired velocity.

As the print wire 55 approaches the at-rest position, the position signal from the position sensor 90 or 105 will become smaller in magnitude than the inverted velocity signal from the inverter 134 at $t_6$. At this point, the polarity of the feedback signal applied to the summer 120 changes and, accordingly, the polarity of the error signal at the output from the summer 120 changes from reversing power to forward power. This causes the bi-directional driver 121 to deenergize the reversing electromagnetic coil 71 and reenergize the forward electromagnetic coil 70 (in the actuator 10), or to apply voltage to the terminals 102 and 103 (in the actuator 100), to apply forward power to the print wire 55 to counteract its return velocity and slow it down. Preferably, this braking power applied to the print wire 55 is designed so that the print wire 55 arrives at its at-rest position with little or no velocity at $t_7$ so there is no overshoot, as is best seen in FIGS. 5(a) and 5(b). Therefore, both the velocity and the position of the print wire 55 are returned to at-rest values simultaneously, obviating the use of energy-absorbing material in the back stop 30, since it now serves only to define a reference at-rest position. Thus, as illustrated in FIGS. 5(a) and 5(b), the print wire actuator 10 or 100 of the present invention reaches the at-rest position in minimum time with negligible overshoot. Accordingly, the minimum cycle time has been significantly decreased.

While the preferred embodiments of the present invention have been illustrated and described, it is understood that it is capable of variation and modification and should not be limited to the precise details set forth, but should include such changes and alterations as fall within the purview of the following claims.

What we claim as new and desire to secure by Letters Patent of the United States is:

1. An impact print wire actuator for imprinting upon a target surface comprising:
   print wire means movable in forward and reverse directions between an at-rest position spaced from the target surface and an impact position against the target surface,
   a source of first and second reference signals,
   drive means coupled to said print wire means for effecting movement thereof in said forward and reverse directions, and
   control means coupled to said drive means and to said print wire means for continuously varying the forward and reverse driving forces applied to said print wire means as said print wire means moves between the at-rest and impact positions thereof as different first and second functions of the instantaneous position of said print wire means and of said first and second reference signals respectively during said forward and reverse movements.

2. The impact print actuator of claim 1, wherein said control means includes means for causing said drive means to accelerate said print wire means to and maintain said print wire means at a predetermined velocity.

3. The impact print actuator of claim 2, wherein said control means includes feedback means for comparing the velocity of said print wire means with a reference velocity.

4. The impact print actuator of claim 1 wherein said first function comprises the velocity of said print wire during forward movement and a velocity reference signal and wherein said second function comprises the position of said print wire during reverse movement and a position reference signal.

5. The impact print actuator of claim 1, wherein said control means includes:
   first means for causing said drive means to accelerate said print wire means to and maintain said print wire means at a first predetermined velocity during the forward mode of operation of said drive means, and
   second means operable for causing said drive means to accelerate said print wire means and to drive said print wire means to said at-rest position during the reversing mode of operation of said drive means.

6. The impact print actuator of claim 5, wherein said control means includes means operable during the reversing mode of operation of said drive means for causing said drive means to decelerate said print wire means from said second predetermined velocity to substantially zero velocity at the at-rest position.

7. An impact print wire actuator for imprinting upon a target surface comprising:
   print wire means movable in forward and reverse directions between an at-rest position spaced from the target surface and an impact position against the target surface,
   drive means coupled to said print wire means for powering the movement of said print wire means,
   position sensing means in communication with said print wire means for continuously generating a position signal corresponding to the instantaneous displacement of said print wire means for monitoring the instantaneous displacement of the print wire means, and
   control means coupled between said position sensing means and responsive to said position signal for controlling the operation of said drive means by effecting a closed loop velocity feedback control circuit during said forward movement and a closed loop position control circuit during said reverse movement.

8. The impact print actuator of claim 7, wherein said control means responds to said position signal to produce a velocity error signal, said control means responding to said velocity error signal to accelerate said print wire means to and maintain said print wire means at a predetermined velocity during said forward motion.

9. The impact print actuator of claim 8, wherein said control means includes means for combining said velocity error signal with a velocity reference signal corresponding to said predetermined velocity to produce a drive signal for actuating said drive means.

10. The impact print actuator of claim 7, wherein said control means includes first means causing said drive means to drive said print wire means toward said target surface, and second means responsive to arrival of said print wire means at said impact position to cause said drive means to drive said print wire means toward the at-rest position.

11. The impact print actuator of claim 10, wherein said second means includes means responsive to arrival of said print wire means at a predetermined position intermediate said impact position and said at-rest position for causing said drive means to decelerate said print wire means to substantially zero velocity at said at-rest position.

12. The impact print actuator of claim 10, wherein said second means includes means for deriving from said position signal a velocity signal, means for receiving and combining said position signal and said velocity signal to produce a corrected position signal, and means for combining said corrected position signal with a position reference signal corresponding to the at-rest position, said fourth means producing a corrected position error signal, said control means responding to said corrected position error signal to adjust said drive means to bring said print wire means to substantially zero velocity at said at-rest position.

13. The impact print actuator of claim 7, wherein said drive means includes a bi-directional piezoelectric drive element.

14. The impact print actuator of claim 7, wherein said position sensing means includes a piezoelectric position feedback element.

15. The impact print actuator of claim 7, wherein said drive means includes electromagnetic means.

16. The impact print actuator of claim 7, wherein said position sensing means includes photoelectric means.

17. An impact print wire actuator for imprinting on a target surface comprising:
  print wire means movable in forward and reverse directions between an at-rest position spaced from the target surface and an impact position against the target surface,
  bi-directional drive means coupled to said print wire means for effecting movement thereof, and
  control means coupled to said drive means and operable in a forward mode and a reversing mode, said drive means being responsive to operation of said control means in the forward mode for driving said print wire means from said at-rest position toward said impact position in a closed-loop velocity control circuit, said drive means being responsive to operation of said control means in the reversing mode thereof for driving said print wire means from said impact position toward said at-rest position in a closed loop position control circuit.

18. The impact print actuator of claim 17, wherein said control means includes position sensing means in communication with said print wire means for generating a position signal corresponding to the displacement of said print wire means from said at-rest position, said control means also including means responsive to arrival of said print wire means at said at-rest position for switching said control means from the forward mode to the reversing mode thereof.

19. The impact print actuator of claim 17, wherein said control means includes position sensing means in communication with said print wire means for sensing the position of said print wire means with respect to said at-rest position, said control means also including feedback means responsive to said position signal for generating a control signal to control the operation of said drive means.

20. The impact print actuator of claim 19, wherein said feedback means includes a first feedback loop operable when said control means is in the forward mode thereof for controlling the velocity of said print wire means, and a second feedback loop operable when said control means is in the reversing mode thereof for controlling the velocity of said print wire means.

21. The impact print actuator of claim 20, wherein said second feedback loop includes first means for accelerating said print wire means to and maintaining said print wire means at a predetermined velocity, and second means responsive to arrival of said print wire means at a predetermined position intermediate said impact position and said at-rest position for causing said drive means to decelerate said print wire means to substantially zero velocity at said at-rest position.

22. The impact print actuator of claim 20, wherein said switch means is operable when said control means is in the forward mode thereof for closing said first feedback loop and opening said second feedback loop, said switch means being operable when said control means is in the reversing mode thereof for closing said second feedback loop and opening said second feedback loop.

23. The impact print actuator of claim 17, wherein said drive means includes electromagnetic means.

24. The impact print actuator of claim 17, wherein said drive means includes first electromagnetic means for driving said print wire means in a first direction toward said impact position, and second electromagnetic means for driving said print wire means in a second direction toward said at-rest position.

25. The impact print actuator of claim 17, wherein said control means includes means operable when said control means is in the forward mode thereof for driving said print wire means at a first continuously controlled power level until a predetermined velocity is reached and for driving said print wire means at a second continuously controlled power level after said predetermined velocity is reached.

26. The impact print actuator of claim 17, wherein said control means includes switch means operable when said control means is in the forward mode thereof for connecting said control means to a velocity reference signal, said switch means being operable when said control means is in the reversing mode for connecting said control means to a position reference signal.

* * * * *